(12) United States Patent
James et al.

(10) Patent No.: US 7,774,526 B2
(45) Date of Patent: Aug. 10, 2010

(54) METHOD FOR DETERMINISTIC TIMED TRANSFER OF DATA WITH MEMORY USING A SERIAL INTERFACE

(75) Inventors: Robert James, San Jose, CA (US); David Carr, Ontario (CA)

(73) Assignee: Integrated Device Technology, Inc., San Jose, CA (US)

( * ) Notice: Subject to any disclaimer, the term of this patent is extended or adjusted under 35 U.S.C. 154(b) by 2 days.

(21) Appl. No.: 11/521,886

(22) Filed: Sep. 14, 2006

(65) Prior Publication Data

US 2008/0071944 A1 Mar. 20, 2008

(51) Int. Cl.
G06F 13/00 (2006.01)
G06F 13/12 (2006.01)
H03K 19/173 (2006.01)

(52) U.S. Cl. ........................ 710/100; 710/65; 710/71; 326/38

(58) Field of Classification Search .................... 710/71
See application file for complete search history.

(56) References Cited

U.S. PATENT DOCUMENTS

| | | | |
|---|---|---|---|
| 5,394,031 A * | 2/1995 | Britton et al. ................. 326/38 |
| 5,423,015 A * | 6/1995 | Chung ......................... 711/108 |
| 6,298,398 B1 | 10/2001 | Elliott et al. |
| 6,298,400 B1 * | 10/2001 | Candelore .................... 710/71 |
| 6,512,804 B1 | 1/2003 | Johnson et al. |
| 6,553,000 B1 | 4/2003 | Ganesh et al. |
| 6,563,821 B1 | 5/2003 | Hong et al. |
| 6,741,591 B1 * | 5/2004 | Kaldani et al. ............... 370/389 |
| 7,068,651 B2 * | 6/2006 | Schmidt et al. ............. 370/389 |
| 7,089,379 B1 * | 8/2006 | Sharma et al. .............. 711/154 |
| 7,106,760 B1 | 9/2006 | Perumal et al. |
| 7,159,137 B2 * | 1/2007 | Nemawarkar et al. ....... 713/503 |
| 7,224,638 B1 * | 5/2007 | Risk et al. .............. 365/189.17 |
| 7,240,143 B1 * | 7/2007 | Scheffler et al. ................ 711/3 |
| 7,272,675 B1 * | 9/2007 | Paul et al. ...................... 710/52 |
| 7,277,425 B1 * | 10/2007 | Sikdar ......................... 370/366 |
| 7,280,590 B1 | 10/2007 | Boecker et al. |
| 7,290,196 B1 * | 10/2007 | Annayya et al. ............. 714/758 |
| 7,558,893 B2 * | 7/2009 | Geer ........................... 710/71 |
| 2004/0111395 A1 * | 6/2004 | Rajgopal et al. ............... 707/3 |
| 2004/0139239 A1 | 7/2004 | Drottar et al. |
| 2004/0139244 A1 | 7/2004 | Hufferd |
| 2004/0178476 A1 | 9/2004 | Brask et al. |
| 2004/0178576 A1 | 9/2004 | Hillis et al. |

(Continued)

OTHER PUBLICATIONS

Office Action mailed Jun. 3, 2008, in related U.S. Appl. No. 11/521,711.

(Continued)

*Primary Examiner*—Mark Rinehart
*Assistant Examiner*—Brian T Misiura
(74) *Attorney, Agent, or Firm*—Hayes and Boone LLP

(57) ABSTRACT

A method for improving the speed and efficiency of transmitting data between two components in which the transmitted data is sent, at least partly, through a serial bus is shown. According to the method, the fields in the data frames being transmitted between the components are of a fixed length regardless of the amount of data that the receiving device can receive at one time. The data bits of the fixed-length frame correspond to the signals accepted as input by the receiving component.

11 Claims, 4 Drawing Sheets

U.S. PATENT DOCUMENTS

| | | | |
|---|---|---|---|
| 2004/0249803 | A1* | 12/2004 | Vankatachary et al. ......... 707/3 |
| 2006/0182139 | A1 | 8/2006 | Bugajski et al. |
| 2008/0071948 | A1 | 3/2008 | James et al. |
| 2008/0126609 | A1 | 5/2008 | James et al. |
| 2009/0086847 | A1* | 4/2009 | Lei et al. .................... 375/295 |

OTHER PUBLICATIONS

Office Action dated Jun. 13, 2008, in related U.S. Appl. No. 11/522,173.

Amendment and Response to Office Action filed Sep. 26, 2008, in related U.S. Appl. No. 11/521,711.

Response to Office Action filed Oct. 16, 2008, in related U.S. Appl. No. 11/522,173.

Final Office Action dated Dec. 15, 2008, in related U.S. Appl. No. 11/521,711.

Office Action dated Jan. 13, 2009, in related U.S. Appl. No. 11/522,173.

Amendment After Final filed Mar. 16, 2009, in related U.S. Appl. No. 11/521,711.

Advisory Action dated Mar. 27, 2009, in related U.S. Appl. No. 11/521,711.

Amendment and Response to Office Action filed Apr. 13, 2009, in related U.S. Appl. No. 11/522,173.

Notice of Appeal, Pre-Appeal Brief Request for Review, and Pre-Appeal Brief Reasons for Request for Review filed May 15, 2009, in related U.S. Appl. No. 11/521,711.

International Search Report and the Written Opinion mailed Jul. 7, 2008, in related International Application No. PCT/US2007/019684.

Final Office Action mailed Jul. 10, 2009, in related U.S. Appl. No. 11/522,173.

Notice of Panel Decision from Pre-Appeal Brief mailed Aug. 18, 2009, in related U.S. Appl. No. 11/521,711.

Amendment and Response to Final Office Action filed Sep. 10, 2009, in related U.S. Appl. No. 11/522,173.

Advisory Action mailed Oct. 6, 2009, in related U.S. Appl. No. 11/522,173.

Appeal Brief filed Oct. 19, 2009, in related U.S. Appl. No. 11/521,711.

Examiner's Answer to Appeal Brief mailed Dec. 18, 2009, in related U.S. Appl. No. 11/521,711.

Amendment and Response to Final Office Action filed Jan. 11, 2010, in related U.S. Appl. No. 11/522,173.

Appellant's Reply Brief filed Feb. 18, 2010, in related U.S. Appl. No. 11/521,711.

Office Action mailed Mar. 10, 2010, in related U.S. Appl. No. 11/522,173.

International Preliminary Report on Patentability mailed Mar. 26, 2009, in related International Application No. PCT/US2007/019684.

* cited by examiner

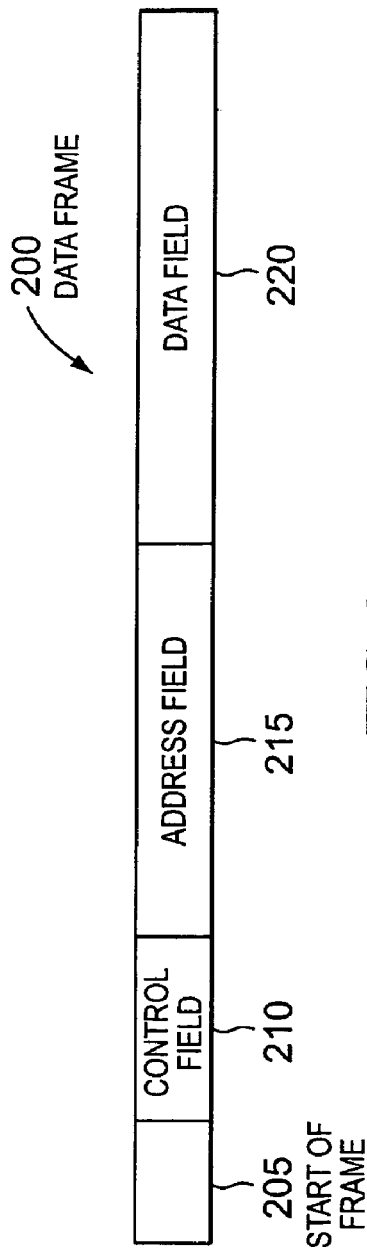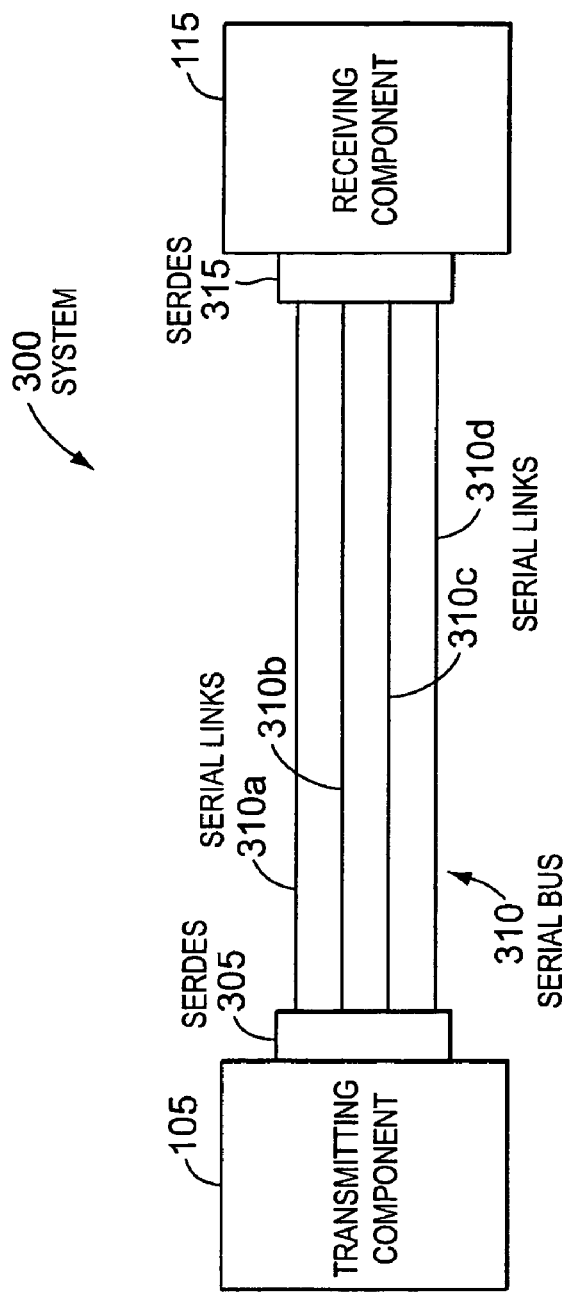

METHOD FOR DETERMINISTIC TIMED TRANSFER OF DATA WITH MEMORY USING A SERIAL INTERFACE

CROSS REFERENCE TO RELATED APPLICATIONS

This application relates to the following co-pending, commonly owned applications: U.S. patent application Ser. No. 11/521,711, entitled "Method for Improved Efficiency and Data Alignment in Data Communications Protocol" and, U.S. patent application Ser. No. 11/522,173, entitled "Programmable Interface for Single and Multiple Host Use", both of which are incorporated in their entirety by reference.

FIELD OF THE INVENTION

The present invention relates to integrated circuits and, in particular, to communication between integrated circuits.

DISCUSSION OF RELATED ART

Modern networking systems allow users to obtain information from multiple data sources. These data sources may include, for example, publicly accessible web pages on the Internet as well as privately maintained and controlled databases. Users may access data from the data sources by entering certain identifying information. For example, a user on the Internet may access data on a website by entering the domain name of the website, where the domain name serves as the identifying information. Similarly, a user of a corporate database may access personnel data about a company employee by entering the last name of the employee, where the last name serves as identifying information. In some instances, a network search engine ("NSE") of a router or switch may facilitate the process of looking-up the location of the requested data.

FIG. 1a shows an exemplary embodiment of a router with an NSE. The router may receive communications from a network and provide this information to a first integrated circuit ("IC"), such as an application-specific IC ("ASIC"). The ASIC then passes the identifying information to the NSE to determine the location in the memory of the requested data. After determining the location of the data, the NSE may request that the memory provide the requested data to the ASIC while also informing the ASIC that the requested data is being sent by the memory. In many networking systems, the NSE, which may also be implemented using an IC, is mounted to the same printed circuit board ("PCB") as the ASIC with the traces of the PCB connecting the two components. Although some networking systems may substitute a network processing unit ("NPU") or a field programmable gate array ("FPGA") for the ASIC in this description, the roles of the respective components remain the same. Thus, in some networking systems, the NPU or FPGA may accept communications from the network and provide the identifying information to the NSE, which may facilitate delivering the requested data to the NPU or FPGA.

In some networking systems, communication between the NSE and the ASIC occurs using a parallel bus architecture on a printed circuit board. Initially, bi-directional parallel buses were used in which an IC used the same pins to both send and receive information. As data rates between the NSE and ASIC increased, networking systems began to be implemented using uni-directional parallel buses in which the components used each pin to either send or receive data, but not both. To accommodate the amount of data being transmitted between the ASIC and the NSE, some current networking systems use an 80-bit bus on the PCB to connect the ASIC and NSE.

Issues have arisen, however, with the parallel bus architecture for connecting the ASIC and the NSE. For example, using a large bus complicates the design and layout process of the PCB. Additionally, increased processing and communication speeds have exposed other limitations with the parallel bus architecture. For example, the data transmitted by a parallel bus should be synchronized, but as communication speeds have increased, the ability to synchronize data transmitted on a parallel bus has become increasingly more difficult. Additionally, ground-bounce may occur when large numbers of data lines in a parallel bus switch from a logical one to a logical zero. Moreover, a parallel bus may consume a large number of pins on the ASIC and the NSE. Further, a parallel bus may require the NSE to be placed very close to the ASIC. But because both the ASIC and NSE may be large, complex ICs, thermal dissipation issues may result in hot spots occurring that may complicate proper cooling of the components on the PCB. A wide, high-speed parallel bus may also make supporting NSEs on plug-in modules difficult or impossible.

In response to the issues posed by using a large parallel bus, some networking devices connect the ASIC and NSE with a serial bus. Further, the networking device may a use a serializer-deserializer ("SERDES") to allow one or both of the ASIC and NSE to continue to use a parallel interface to communicate with the other over the serial bus. For example, when the ASIC communicates with the NSE, a SERDES may convert the parallel output from the ASIC to a serial data stream to be transmitted to the NSE over a serial data bus. Another SERDES may receive this serial transmission and convert it to a parallel data stream to be processed by the NSE. As a result, instead of transmitting data over an 80-bit parallel bus at 250 MHz Double Data Rate (40 Gbps), networking devices may transmit data over 8 serial lanes operating at 6.25 Gbps. Despite this increase in data transmission rates as compared to systems using a parallel bus architecture, increasing clock speeds and data transmission rates may require developers of networking devices to seek additional methods for reducing the complexity of data transmission and increasing the transmission rates between the ASIC and the NSE.

SUMMARY

In accordance with the invention, a method for reducing the variance of the latency of transmitting a set of data frames from a first component to a second component is disclosed, where the first and second components both being coupled by a set of pins to the same printed circuit board. The method includes the steps of forming each data frame in the set of data frames to have at least a control field, an address field, and a data field, where the address field and the data field are both fixed-length, the fixed-length of the each field being the same for each data frame in the set of data frames; mapping the control field, the address field, and the data field into each data frame in the set of data frames so that the control field, the address field, and the data field are logically mapped to correspond to the signals on a parallel interface of the second component; transmitting each data frame in the set of data frames to the second component at least partly on a serial bus; and converting each data frame in the set of data frames to be received on the parallel interface on the second component.

These and other embodiments of the invention are further discussed below with respect to the following figures.

BRIEF DESCRIPTION OF THE DRAWINGS

FIG. 2 shows an exemplary data frame sent according to the present invention

FIG. 3 shows an exemplary system in which the invention may be practiced.

DETAILED DESCRIPTION

Figure 1A:
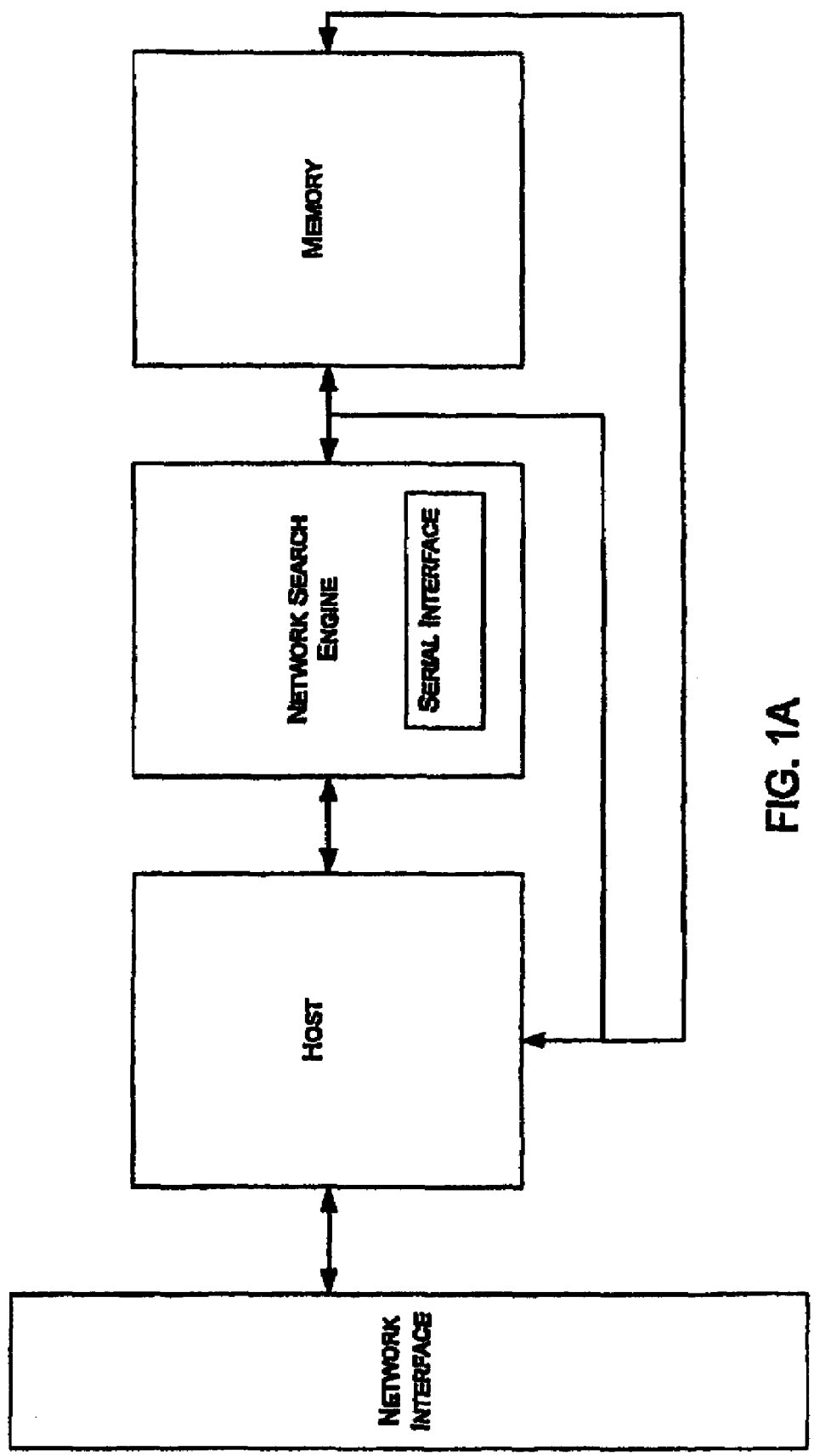
FIG. 1a shows an exemplary system of a router with a network search engine.
Figure 1B:
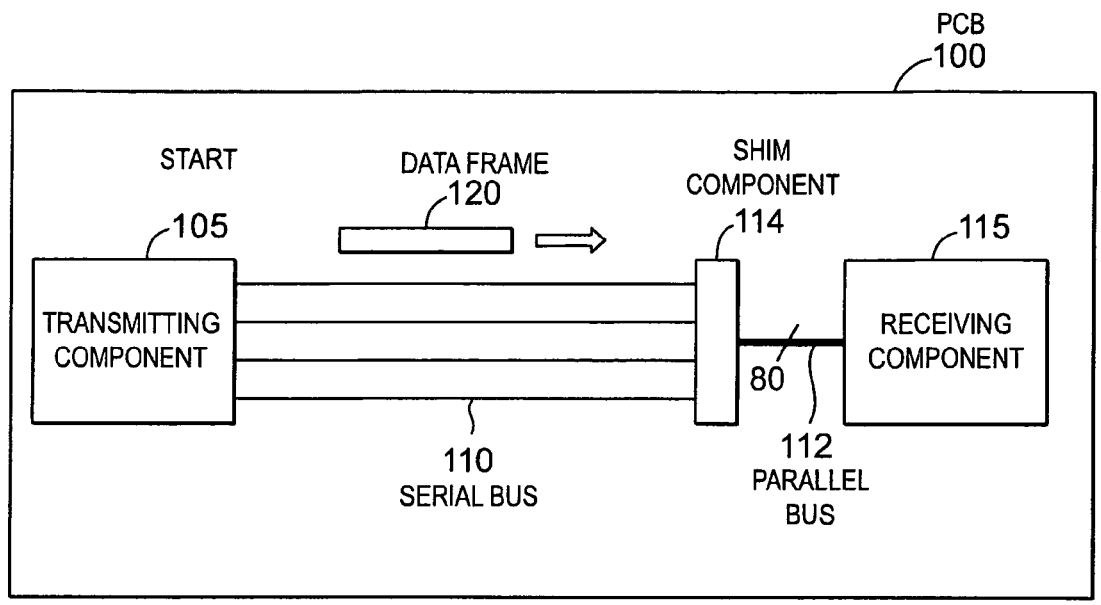
FIG. 1b shows an exemplary block diagram of a circuit capable of implementing the invention.

FIG. 1b shows an exemplary block diagram of a circuit capable of implementing the invention. As shown in FIG. 1b, transmitting component 105 may be sending data frame 120 over serial bus 110 to receiving component 115, where both transmitting component 105 and receiving component 115 are coupled to PCB 100. Shim component 114 may convert the serial data sent by transmitting component 105 so that it may be transmitted over parallel bus 112 and received by receiving component 115 using a parallel interface. In some embodiments, the parallel interface may correspond to physical pins on receiving component 115. In some embodiments, shim 114 may be integrated into receiving component 115.

Figure 1C:
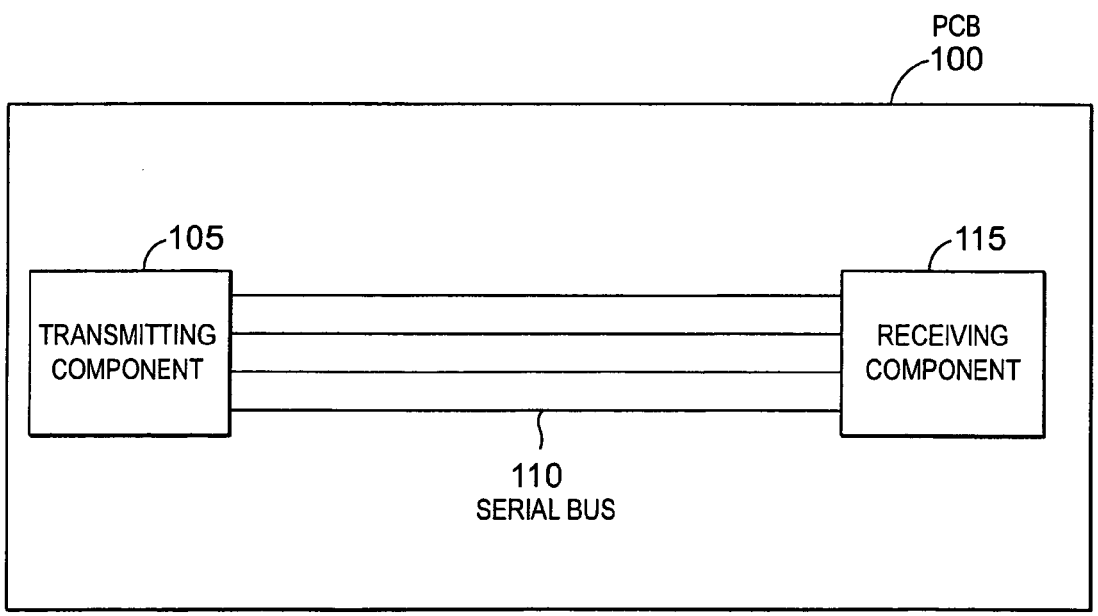
FIG. 1c shows an exemplary block diagram of a circuit capable of implementing the invention.

FIG. 1c shows an exemplary block diagram of a circuit capable of implementing the invention. In FIG. 1c, the shim component has been integrated into receiving component 115. Transmitting component 105 and receiving component 115 may be connected by serial bus 110. In the exemplary embodiment of FIG. 1c, a logical parallel bus may be used to transfer data from the integrated shim component to receiving component 115 using a logical parallel interface on receiving component 115. In some embodiments, receiving component 115 may have a logical parallel interface that does not correspond to physical pins. For example, in the embodiment in which the shim component is integrated with receiving component 115, the shim component may accept serially transmitted data and then use a logical parallel bus to transmit the data to receiving component 115, which may receive the data using a logical parallel interface. In this exemplary embodiment, both transmitting component 105 and receiving component 115 may be coupled to printed circuit board 100.

Figure 1D:
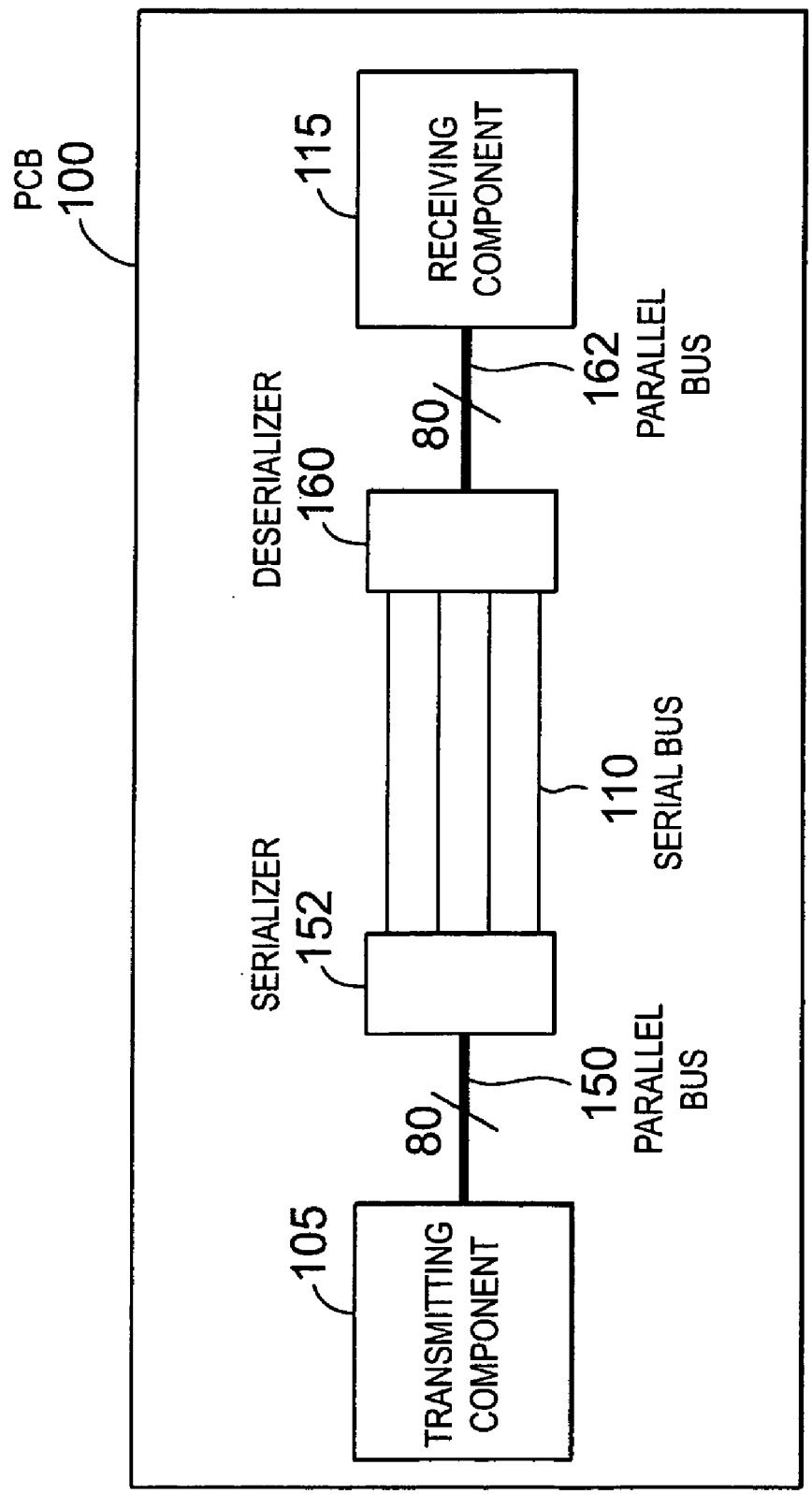
FIG. 1d shows an exemplary block diagram of a circuit capable of implementing the invention.

FIG. 1d shows an exemplary block diagram of a circuit capable of implementing the invention. In FIG. 1d, transmitting component 105 may send data over parallel bus 150 to serializer 152 which converts the parallel data to serial data which is then transmitted over serial bus 110 to de-serializer 160. De-serializer 160 accepts the serial data and transforms it into parallel data to be transmitted over parallel bus 162 to receiving component 115. In the exemplary embodiment, components 105 and 115 may be coupled to printed circuit board 100.

Many different situations may cause sending component 105 to send data frame 120 to receiving component 115. For example, sending component 105 may be used to control the operation of PCB 100, which may be a component of a router on a network. PCB 100 may receive a request for a web page on the Internet, the request containing identifying information for the webpage, such as a uniform resource locator ("URL"). To resolve this request, sending component 105 may compose data frame 120, which may include the identifying information received by PCB 100, and send data frame 120 to receiving component 115. Receiving component 115 may be specially designed to quickly and efficiently lookup data when given specific identifying information. For example, receiving component 115 may be an NSE that is designed to quickly look up an IP address for a website when given the URL of that website.

FIG. 2 shows an exemplary data frame sent according to the present invention. Transmitting component 105 sends data frame 200 across serial bus 110 to receiving component 115. As shown in FIG. 2, data frame 200 may include start of frame 205, control field 210, address field 215, and data field 220. Start of frame 205 may be one or more bits signifying that a new frame is being transmitted. Control field 210 includes control information for data frame 200. Control information may include the command to be executed by receiving component 115, the length in bits of the search key, the databases for receiving component 115 to search, and additional receiving components to search. Address field 215 may include one or more of the addresses for receiving component 115 and transmitting component 105. Data field 220 includes data being transmitted by transmitting component 105 to receiving component 115. Data field 220 may contain the identifying data such as a URL.

In some embodiments, each of control field 210, address field 215, and data field 220 may be a fixed-length field. In some embodiments, the data to be transported in one or more of control field 210, address field 215, and data field 220 may be less than the fixed-length of the field. As a result, each of control field 210, address field 215, and data field 220 may include "don't care" bits that, although transmitted by transmitting component 105, may not be processed by receiving component 115. "Don't care" bits may be used to achieve a fixed-length field in one or more of control field 210, address field 215, and data field 220 by filling extra bit space when fewer than the fixed number of bits in a field are being transmitted in data frame 200. For example, data frame 200 may have a fixed-length of 96 bits for data field 220. Receiving component 115, however, may have 80 pins for receiving data. Even though 96 bits of data may be transmitted in data packet 200, only 80 bits of data may be received by receiving component 115 at one time. In this case, the remaining 16 data bits in data field 220 may be filled by "don't care" bits, thus allowing data field 200 to be 96 bits long. "Don't care" bits may be similarly used as padding in control field 210 and address field 215 when the number of bits to be transmitted in these fields is less than the fixed length of these fields. Receiving component 115 may have more or less than 80 pins for receiving data. Data frame 200 may have a fixed length that is more or less than 96 bits.

The number and order of bits in one or more of control field 210, address field 215, and data field 220 may be mapped into data frame 200 as a function of the pins of receiving component 115. For example, receiving component 115 may have 80 pins for receiving data; to match these 80 pins, data field 220 of data frame 200 may have a length of 80 bits. In some embodiments, each bit in data field 220 may correspond to a specific pin of receiving component 115. For example, the first bit in data field 220 (bit 0) may correspond to the data bit to be input into the first pin (pin 1) of receiving component 115. Each succeeding data bit in data field 220 may correspond with the bit to be input into each succeeding pin of receiving component 115, respectively. Thus, data bit 1 in data field 220 of data frame 200 may correspond to the data bit to be input into pin 2, bit 2 to the data bit to be input into pin 3, etc. As a result, instead of encoding the data placed in data frame 200 and then sending data frame 200 to receiving component 115 to be decoded, the present invention maps the data to data frame 200 so that the appropriate data bit of data frame 200 will be received by the appropriate pin on receiving component 115. This mapping of the data bits in data frame 100 to correspond with specific pin of receiving component 115 may eliminate the need to encode and decode the data, possibly resulting in a reduced latency between the time that transmitting component 105 transmits data frame 200 and receiving component 115 can begin processing the transmitted data.

FIG. 3 shows an exemplary system in which embodiments of the invention may be practiced. As shown in FIG. 3, system 300 includes transmitting component 105, receiving component 115, serializer-deserializers ("SERDES") 305 and 315, and serial bus 310. Serial bus 310 includes serial links 310*a-d* in the exemplary embodiment shown in FIG. 3. Some embodiments may have more or less than four serial links in serial bus 310. The exemplary embodiment shown in FIG. 3 shows SERDES 305 and 315 integrated with transmitting component 105 and receiving component 115, respectively. In the exemplary embodiment of FIG. 3, a logical parallel bus may be used to transmit data between SERDES 315 and receiving component 115. A logical parallel interface may be used by receiving component 115 to accept the data transmitted on the logical parallel bus.

Transmitting fixed-length data frame 200 may improve the ability of a system to detect errors. Systems transmitting data over a serial connection may transmit information in successive data bits using start of frame 205 to denote the start of each new data frame. If the system counts the number of bits received since receiving the last start of frame 205, then the system may determine if the next start of frame 205 is corrupted For example, a system may transmit fixed-length frames containing 160 bits of data. In an exemplary system in which start of frame field 205 contains 1 bit, the exemplary system will know to expect 159 bits of data before receiving the start of frame field 205 for the next packet. If the exemplary system does not receive start of frame 205 after 159 data bits, then the system will automatically know that the next start of frame field has been corrupted.

Transmitting fixed-length data frame 200 may allow transmitting component 105 to regularly clock fixed-length data frames 200 out to receiving component 115 because transmitting component 105 may not have to wait until receiving an entire command before sending out the first data packet to receiving component 115. For example, transmitting component 105 may be transmitting a command that is 640 bits long. Transmitting component 105 may transmit data in 160 bit fixed-length frames 200. In this exemplary embodiment, transmitting component 115 may begin transmitting fixed-length frames 200 after receiving 160 bits of data. Transmitting component 115 may continue to transmit fixed-length data frames 200 each time it receives each successive 160-bit chunk of data without having to wait until the entire 640 bit command has been received.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transmitting a set of data frames from a first component to a second component, the first and second components both being connected by a set of pins to the same printed circuit board, the method comprising:
   forming each data frame in the set of data frames to have at least a control field, an address field, and a data field, wherein each data field includes a plurality of bits;
   the control field being a fixed-length, the fixed-length of the control field being the same for each data frame in the set of data frames;
   the address field being a fixed-length, the fixed-length of the address field being the same for each data frame in the set of data frames;
   the data field being a fixed-length, the fixed-length of the data field being the same for each data frame in the set of data frames;
   mapping, at the first component, the data field into each data frame in the set of data frames so that each bit of the data field is mapped to correspond to a specific pin on a parallel interface of the second component;
   transmitting each data frame in the set of data frames to the second component at least partly on a serial bus; and
   converting each data frame in the set of data frames to be received on the parallel interface on the second component.

2. The method of claim 1 wherein at least one of the first component and the second component is a network search engine.

3. The method of claim 1 wherein at least one of the first component and the second component is at least one of an integrated circuit, a field programmable gate array, a complex programmable logic device, and a field programmable object array.

4. The method of claim 3 wherein the integrated circuit is an application specific integrated circuit.

5. The method of claim 1 wherein the first component has a parallel interface for transmitting data to the second component, the method further comprising the step of:
   converting each data frame in the set of data frames transmitted by the parallel interface of the first component so that the data frames can be transmitted at least partly on a serial bus.

6. The method of claim 5 wherein the step of converting each data frame to be transmitted from the parallel interface of the first component is performed by a serializer-deserializer.

7. The method of claim 1 wherein the step of converting each data frame to be received by the second component is performed by a serializer-deserializer.

8. The method of claim 1 wherein each data frame in the set of data frames to be transmitted has a total fixed-length of 192 bits.

9. The method of claim 8 wherein each data frame in the set of data frames to be transmitted has a total of 160 bits of data.

10. The method of claim 1 wherein the serial bus has at least 2 serial lanes for transmitting data frames in the set of data frames from a first component to a second component.

11. The method of claim 1 wherein the parallel interface of the second component corresponds to a logical interface.

* * * * *